United States Patent
Abrami et al.

(10) Patent No.: US 11,545,132 B2
(45) Date of Patent: Jan. 3, 2023

(54) SPEECH CHARACTERIZATION USING A SYNTHESIZED REFERENCE AUDIO SIGNAL

(71) Applicant: International Business Machines Corporation, Armonk, NY (US)

(72) Inventors: Avner Abrami, New York, NY (US); Mary Pietrowicz, Baldwin Place, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 245 days.

(21) Appl. No.: 16/553,997

(22) Filed: Aug. 28, 2019

(65) Prior Publication Data
US 2021/0065676 A1 Mar. 4, 2021

(51) Int. Cl.
*G10L 13/00* (2006.01)
*G10L 13/047* (2013.01)
*G06N 3/08* (2006.01)

(52) U.S. Cl.
CPC ............... *G10L 13/00* (2013.01); *G06N 3/08* (2013.01); *G10L 13/047* (2013.01)

(58) Field of Classification Search
None
See application file for complete search history.

(56) References Cited

U.S. PATENT DOCUMENTS

| 5,694,520 | A | 12/1997 | Ly berg |
| 7,024,359 | B2 | 4/2006 | Chang et al. |
| 7,548,651 | B2 | 6/2009 | Shozakai et al. |
| 7,684,988 | B2 | 3/2010 | Barquilla |
| 9,916,825 | B2 | 3/2018 | Edrenkin |
| 10,319,369 | B2 | 6/2019 | Cassagne et al. |
| 10,643,600 | B1 * | 5/2020 | Aryal ..................... G10L 13/033 |
| 10,796,715 | B1 * | 10/2020 | Berisha ................ A61B 5/4848 |
| 10,930,263 | B1 * | 2/2021 | Mahyar ................. G10L 15/005 |
| 2019/0362740 | A1 * | 11/2019 | Hauptman .............. G10L 25/66 |

(Continued)

FOREIGN PATENT DOCUMENTS

WO WO-2019191251 A1 * 10/2019 ............... G06N 3/08

OTHER PUBLICATIONS

Sabrina Lo'pez, Pablo Riera, Man'a Florencia Assaneo, Manuel Egui'a, Mariano Sigman,& Marcos A. Trevisan; Vocal caricatures reveal signatures of speaker identity; Dec. 3, 2013 URL: file:///C:/Users/rmishra/Downloads/srep03407.pdf (Year: 2013).*

(Continued)

*Primary Examiner* — Richa Mishra
(74) *Attorney, Agent, or Firm* — Amin, Turocy & Watson, LLP

(57) ABSTRACT

Techniques regarding speech characterization are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a speech analysis component that can determine a condition of an origin of an audio signal based on a difference between a first feature of the audio signal and a second feature of a synthesized reference audio signal.

20 Claims, 12 Drawing Sheets

(56) References Cited

U.S. PATENT DOCUMENTS

2020/0058290 A1* 2/2020 Chae ............... G10L 13/00
2020/0211540 A1* 7/2020 MacConnell ........... G10L 15/16

OTHER PUBLICATIONS

Chao et al., "Accent Issues in Large Continuous Speech Recognition", International Journal of Speech Technology: Chinese Spoken Language Technology, vol. 7, No. 2-3, Apr. 30, 2004, pp. 141-153, Klewer Academic Publishers, first available electronically Oct. 17, 2010, accessed Jul. 23, 2019 6:27 PM EST. 13 pages.
Ramon, "Automatic Creation of Scenarios for Evaluating Spoken Dialogue Systems via User-Simulation", Knowledge-Based Systems, vol. 106, pp. 51-73, Elvesier Science BV, first available (electronically) Aug. 7, 2016, last updated Apr. 17, 2019, accessed Jul. 23, 2019 6:29 PM EST. 3 pages.
Wang, et al. "Hunan Dialects Identification Based on GMM and Difference Speech Feature." Computer Engineering and Applications, vol. 45, No. 35, pp. 129-131, published Dec. 11, 2009, North China Computing Technology Institute, last revised Jun. 1, 2010, first available (electronically) Aug. 15, 2010; http://en.cnki.com.cn/Article_en/CJFDTOTAL-JSGG200935041.htm.
Zissman et al., "Automatic Dialect Identification of Extemporaneous Conversational, Latin American Spanish Speech." Lincoln Laboratory, Massachusetts Institute of Technology. ICASSP 1996. 4 pages.
Chen et al., "Dialect recognition using adapted phonetic models." Interspeech 2008. 4 pages.
Reynolds et al., "Speaker varication using adapted gaussian mixture models." Digital Signal Processing, 10 (1-3):19-41, 2000. 23 pages.
Wong et al., "Language identification using efficient gaussian mixture model analysis." In Australian International Conference on Speech Science and Technology, 2000. 6 pages.
Torres-Carrasquillo, et al. "Dialect identification using Gaussian Mixture Models." In Proceedings of the Speaker and Language Recognition Workshop, Spain, 2004. 4 pages.
Alorifi. "Automatic Identification of Arabic Dialects Using Hidden Markov Models". In University of Pittsburgh, 2008. 132 pages.
Ma et al., "Chinese Dialect Identification Using Tone Features Based on Pitch Flux." In Proceedings of ICASSP 2006. 4 pages.
Chen et al., "A linquistically-informative approach to dialect recognition using dialect-discriminating context dependent phonetic models." ICASSP 2010. 4 pages.
Koller. "Automatic Speech Recognition and Identification of African Portuguese." Chair of Computer Science 6, Human Language Technology and Pattern Recognition, RWTH Aachen University, Germany, 2010. 8 pages.
Peters et al., "Identification of Regional Varieties by Intonational Cues. An Experimental Study on Hamburg and Berlin German." 45(2):115-139, 2002. 25 pages.
Barkat et al., "Prosody as a Distinctive Feature for the Discrimination of Arabic Dialects." 6th European Conference on Speech Communication and Technology (EUROSPEECH'99) Budapest, Hungary, Sep. 5-9, 1999. http://www.isca-speech.org/archive. 3 pages.
Hamdi-Sultan, et al., "Speech Timing and Rhythmic Structure in Arabic Dialects: A Comparison of Two Approaches." https://halshs.archives-ouvertes.fr/halshs-01740967. Mar. 2008. 5 pages.
Ramus, "Acoustic Correlates of Linguistic Rhythm: Perspectives." Proceedings of Speech Prosody 2002. 6 pages.
Biadsy "Automatic Dialect and Accent Recognition and its Application to Speech Recognition", Doctoral Dissertation, Columbia University, 2011. 190 pages.
Audoeering "OpenSMILE feature extraction toolkit." Audoeering, https://www.audeering.com/opensmile/. Last Accessed Aug. 27, 2019. 3 pages.
Boersma, et al. "Praat: doing phonetics by computer." http://www.fon.hum.uva.nl/praat/. Last Accessed Aug. 27, 2019. 2 pages.
Liu, et al., "Dialect Identification: Impact of Differences Between Read Versus Spontaneous Speech." In EUSIPCO-2010, pp. 49-53, 2010. 4 pages.
Shen et al., "Improved GMM-based language recognition using constrained MLLR transforms", ICASSP 2008. 4 pages.
Torres-Carrasquillo et al., "Eigen-channel Compensation and Discriminatively Trained Gaussian Mixture Models for Dialect and Accent Recognition." Interspeech 2008. 4 pages.
Singer et al., "The MITLL NIST LRE 2011 Language Recognition System." Odyssey 2012 The Speaker and Language Recognition Workshop, pp. 4994-4997. 4 pages.
Demarco et al., "Iterative classification of regional British Accents in i-vector space." Proceedings of the Symposium on Machine Learning in Speech and Language Processing (SIGML 2012), 2012. 4 pages.
Behravan. "Dialect and Accent Recognition." Master's Thesis, University of Eastern Finland, Dec. 2012. 75 pages.
Belinkov et al., "A Character-level Convolutional Neural Network for Distinguishing Similar Languages and Dialects." rXiv:1609.07568v1 [cs.CL] Sep. 24, 2016. 8 pages.
Kitashov et al., "Foreign English Accent Adjustment by Learning Phonetic Patterns", arXiv:1807.03625v1 [cs.SD] Jul. 9, 2018. 5 pages.
Tjalve. "Accent Features and Idiodictionaries: On Improving Accuracy for Accented Speakers." ASR, PhD Dissertation, Department of Phonetics and Linguistics, University College London, Mar. 2007. 235 pages.
Nallasamy et al., "Active Learning for Accent Adaptation in Automatic Speech Recognition," SLT 2012. 6 pages.
Sitaram et al., "Discovering Canonical Indian English Accents: A Crowdsourcing-based Approach." Proceedings of the eleventh International Conference on Language Resources and Evaluation (REC-2018), 2018. 6 pages.
Goel, et al. "Extracting Speaker's Gender, Accent, Age and Emotional State from Speech." Interspeech 2018. 2 pages.
Yang et al., "Joint Modeling of Accents and Acoustics for Multi-Accent Speech Recognition," Interspeech 2018. arXiv:1802.02656v1 [cs.CL] Feb. 7, 2018. 5 pages.
Sedaaghi. "A Comparative Study of Gender and Age Classification in Speech Signals." Iranian Journal of Electrical and Electronic Engineering, (2009). 12 pages.
Lingenfelser, "Age and Gender Classification from Speech using Decision Level Fusion and Ensemble Based Techniques," Interspeech 2010. 4 pages.
Chaudhari et al., "A Review of Automatic Speaker Age Classification, Recognition, and Idnetifying Speaker Emotion Using Voice Signal." International Journal of Science and Research (IJSR). 2012. 5 pages.
Feld et al., "Automatic speaker age and gender recognition in the car for tailoring dialog and mobile services," Interspeech 2010 . 4 pages.
Porat et al., "Age recognition based on speech signals using weights supervector." Interspeech 2010. 4 pages.
Zhang et al., "Rapid Speaker Adaptation in Latent Speaker Space with Non-negative Matrix Factorization." ICASSP 2011. 36 pages.
Bocklet et al., "Age and gender recognition for telephone applications based on GMM supervectors and Support Vector Machines." ICASSP 2011. 4 pages.
Bosch et al., "On a computational model for language acquisition: modeling cross-speaker generalization," In Proc. Int. Conf. Text, Speech and Dialogue, Czech Republic, 2009. 8 pages.
Metze et al., "Comparison of Four Approaches to Age and Gender Recognition for Telephone Applications," ICASSP 2007. 4 pages.
Brown et al., "Speaking fundamental frequency characteristics as a function of age and professional singing", Journal of Voice 5(4):310-315, 1991. 6 pages.
Bruckl, "Women's Vocal Aging: a Longitudinal Approach," Interspeech 2007. 4 pages.
Grzybowska et al., "Speaker age classification and regression using i-vectors," Interspeech 2016. 5 pages.
Pribil et al., "GMM-based speaker age and gender classification in Czech and Slovak, Journal of Electrical Engineering," 68(1):3-12, 2017. 10 pages.

(56) References Cited

OTHER PUBLICATIONS

Mell, Peter, et al. "The NIST Definition of Cloud Computing." National Institute of Standards and Technology. Sep. 2011. 7 pages.

* cited by examiner

SPEECH CHARACTERIZATION USING A SYNTHESIZED REFERENCE AUDIO SIGNAL

BACKGROUND

The subject disclosure relates to speech characterization using one or more synthesized reference audio signals, and more specifically, determining one or more conditions associated with a speaker based on one or more differences between a given audio signal and one or more synthesized reference audio signals.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can characterize one or more speech patterns are described.

According to an embodiment, a system is provided. The system can comprise a memory that can store computer executable components. The system can also comprise a processor, operably coupled to the memory, and that can execute the computer executable components stored in the memory. The computer executable components can comprise a speech analysis component that can determine a condition of an origin of an audio signal based on a difference between a first feature of the audio signal and a second feature of a synthesized reference audio signal.

According to an embodiment, a computer-implemented method is provided. The computer-implemented method can comprise determining, by a system operatively coupled to a processor, a condition of an origin of an audio signal based on a difference between a first feature of the audio signal and a second feature of a synthesized reference audio signal.

According to an embodiment, a computer program product for characterizing speech patterns is provided. The computer program product can comprise a computer readable storage medium having program instructions embodied therewith. The program instructions can be executable by a processor to cause the processor to determine, by the processor, a condition of an origin of an audio signal based on a difference between a first feature of the audio signal and a second feature of a synthesized reference audio signal.

DETAILED DESCRIPTION

Figure 1:
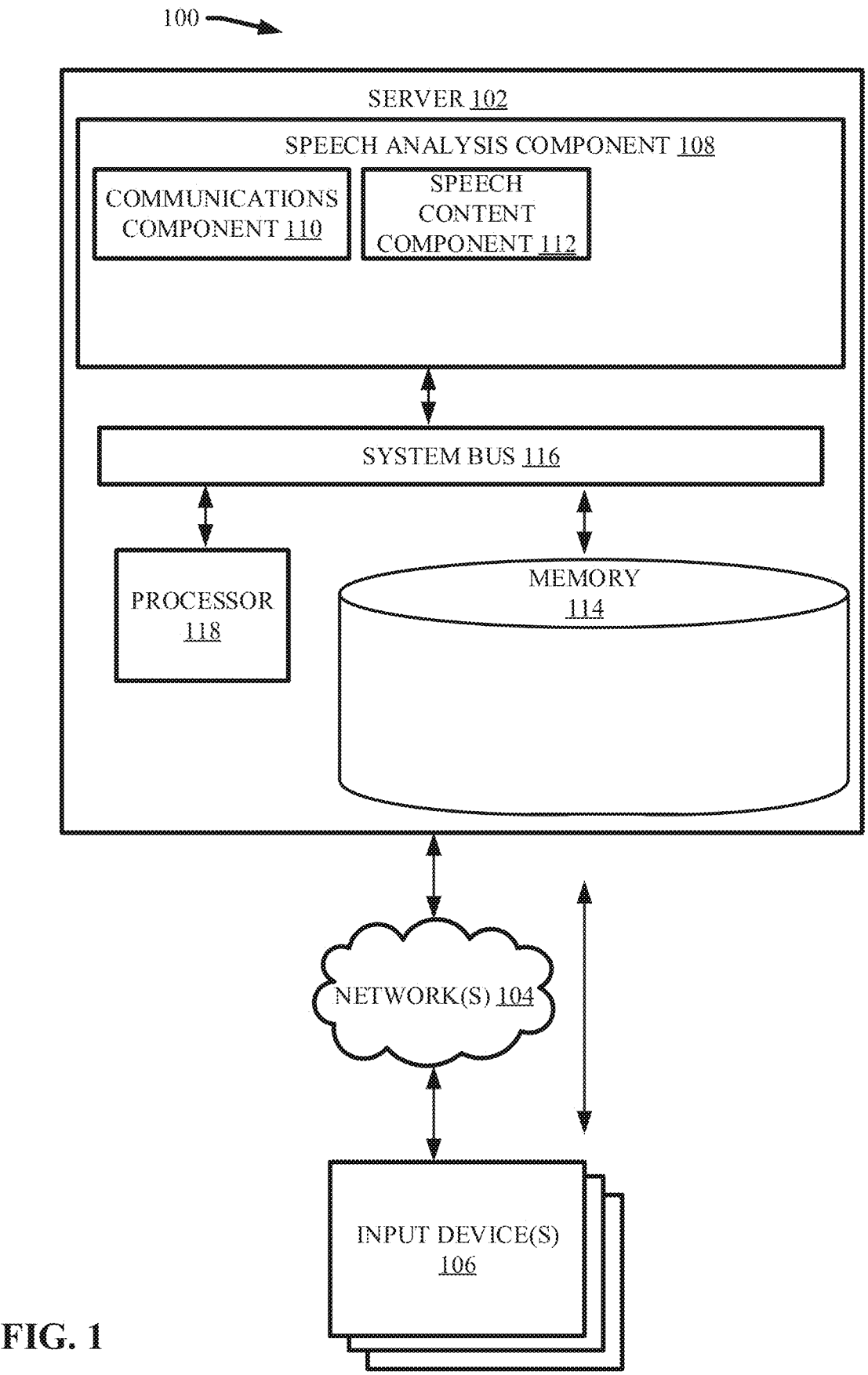
FIG. 1 illustrates a block diagram of an example, non-limiting system that can characterize one or more speech patterns to determine one or more conditions of a speaker in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Speech characterization techniques analyze audio samples to detect one or more speech patterns that can be associated with one or more conditions of the speaker. Conventional speech characterization techniques attempt to detect speech patterns based on complex model structures that can require numerous audio samples to establish a desired level of accuracy and/or precision. Example conventional speech characterization techniques can include: phonotactic approaches (e.g., based on phonotactic constraints), prosodic approaches (e.g., language-dependent variations in pitch, timing, emphasis, loudness, and/or articulation), spectral approaches (e.g., based on spectral and/or acoustic features), and/or the like.

Various embodiments of the present invention can be directed to computer processing systems, computer-implemented methods, apparatus and/or computer program products that facilitate the efficient, effective, and autonomous (e.g., without direct human guidance) characterization of speech to identify one or more conditions of a speaker. For example, a sample of speech can comprise one or more deterministic features and/or speaker-specific features. The one or more deterministic features can be based on the content of the speech sample, such as the words comprised within a given sentence. The speaker-specific features can be unique to the given speaker and/or can encapsulate one or more speech patterns that can relate to one or more conditions (e.g., origin, emotional state, and/or health) of the speaker. One or more embodiments described herein can include generating one or more synthetic speech samples expressing the same content as the speech sample subject to characterization. Thereby, the one or more synthetic speech samples can be used as reference signals from which to detect and/or remove the one or more deterministic features from the speech sample so as to identify one or more speech patterns that are specific to the given speaker.

The computer processing systems, computer-implemented methods, apparatus and/or computer program products employ hardware and/or software to solve problems that are highly technical in nature (e.g., speech characterizations), that are not abstract and cannot be performed as a set of mental acts by a human. An individual, or even a plurality of individuals, cannot readily generate a plurality of synthetic audio signals with the same efficiency as the embodiments described herein. Further, an individual cannot readily extract a plurality of feature vectors from a given audio signal and/or synthesized reference audio signal in the manner described herein.

FIG. 1 illustrates a block diagram of an example, non-limiting system 100 that can characterize one or more audio signals to determine one or more conditions related to a speaker. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or input devices 106. The server 102 can comprise speech analysis component 108. The speech analysis component 108 can further comprise communications component 110 and/or speech content component 112. Also, the server 102 can comprise or otherwise be associated with at least one memory 114. The server 102 can further comprise a system bus 116 that can couple to various components such as, but not limited to, the speech analysis component 108 and associated components, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the speech analysis component 108 can be provided on the one or more servers 102, it should be appreciated that the architecture of system 100 is not so limited. For example, the speech analysis component 108, or one or more components of speech analysis component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. A user of the system 100 can utilize the one or more input devices 106 to input one or more speech samples into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

A user of the system 100 can utilize the one or more input devices 106 and/or the one or more networks 104 to input one or more settings and/or commands into the system 100. For example, in the various embodiments described herein, a user of the system 100 can operate and/or manipulate the server 102 and/or associate components via the one or more input devices 106. Additionally, a user of the system 100 can utilize the one or more input devices 106 to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, in various embodiments the one or more input devices 106 can capture one or more speech samples from a speaker (e.g., via microphone comprised within the one or more input devices 106). Further, the one or more input devices 106 can generate one or more audio signals that characterize the one or more captured speech samples. In other words, the one or more audio signals can comprise a plurality of data points describing various characteristic of the one or more speech samples. For instance, the one or more audio signals can describe the content, volume, pitch, rhythm, tone, emphasis, and/or length of the one or more speech samples.

In one or more embodiments, the communications component 110 can receive one or more audio signals from the one or more input devices 106 (e.g., via a direct electrical connection and/or through the one or more networks 104) and share the data with the various associate components of the speech analysis component 108. The one or more audio signals can comprise one or more deterministic features and/or speaker-specific features. The one or more deterministic features can regard the content of the audio signals, such as the words and/or sentence structure of the speech sample characterized by the audio signal. The one or more speaker-specific features can regard one or more speech patterns unique to the given speaker.

In one or more embodiments, the one or more speech samples can comprise predefined content. For example, the speech samples can recite one or more predefined sentences. For instance, a speaker can speak the one or more predefined sentences into the one or more input devices 106, which can then process the captured speech sample into one or more audio signals and/or share the audio signals with the speech analysis component 108 (e.g., via the communications component 110 and/or the one or more networks 104).

In various embodiments, the one or more speech samples can comprise unscripted content. For example, the speech samples can recite one or more sentences chosen spontaneously by the speaker. Wherein the content of the one or more speech samples is not predefined, the speech content component 112 can analyze the one or more audio signals to determine the content of the speech sample. Example content characteristics that can be determined by the speech content component 112 can include, but are not limited to: words comprised within the speech sample, sentence structure comprised within the speech sample, grammar comprised within the speech sample, a combination thereof, and/or the like.

The speech content component 112 can use one or more machine learning models to determine the content of the one or more speech samples from the audio signals. As used herein, the term "machine learning models" can refer to an application of artificial intelligence technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering.

Figure 2:
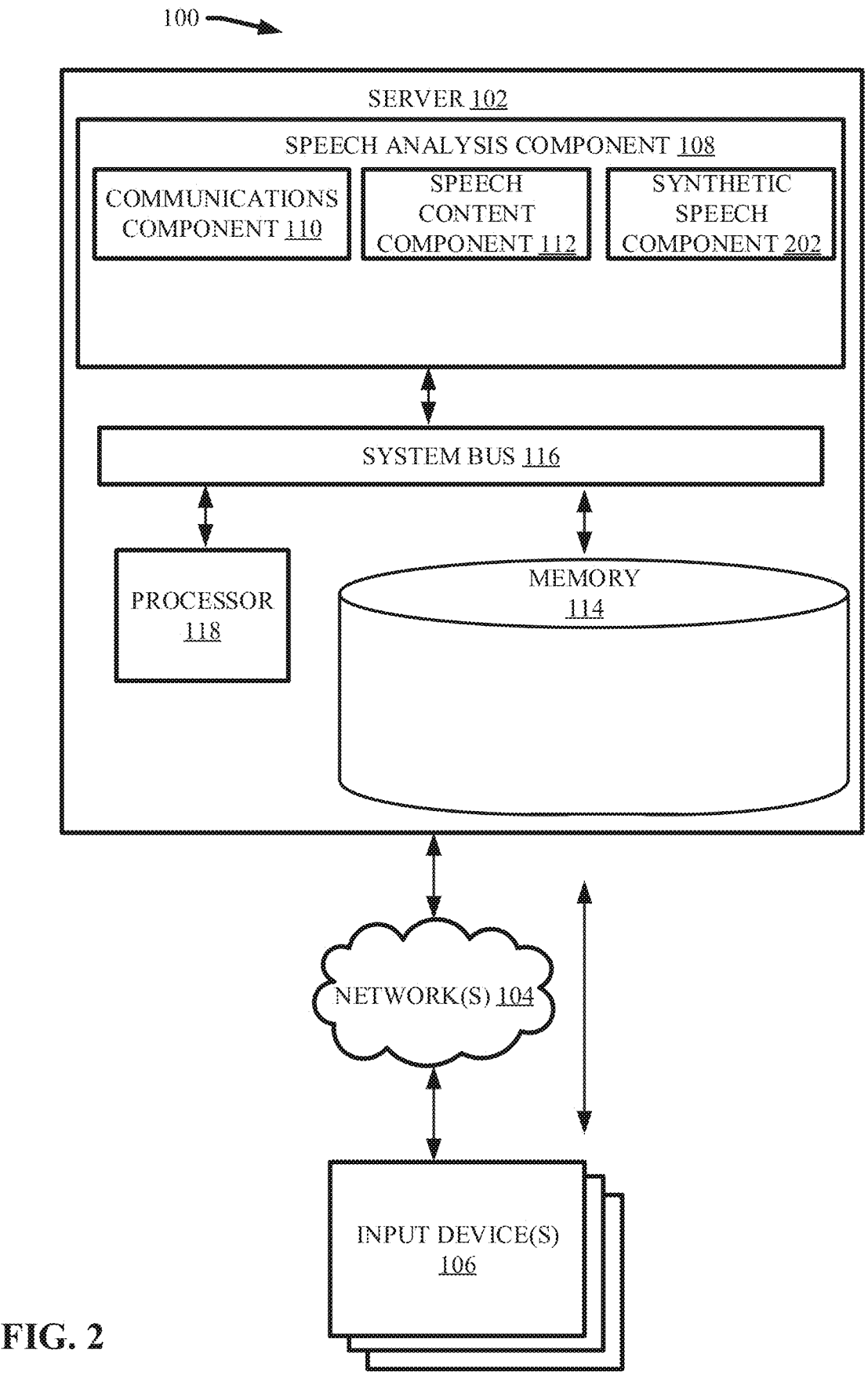
FIG. 2 illustrates a block diagram of an example, non-limiting system that can generate one or more synthetic reference audio signals to facilitate analyzing one or more audio signals originating from a given speaker in accordance with one or more embodiments described herein.

FIG. 2 illustrates the example, non-limiting system 100 further comprising synthetic speech component 202 in accordance with one or more embodiments described herein. Repetitive description of like elements employed in other embodiments described herein is omitted for sake of brevity. In various embodiments, the synthetic speech component 202 can generate one or more synthetic audio signals that can be used as reference signals regarding the content of the one or more audio signals.

The one or more synthesized audio signals can characterize one or more synthetic speech samples. The synthetic speech component 202 can generate one or more synthesized audio signals that comprise the same content as the one or more audio samples and/or audio signals. For example, in one or more embodiments the synthetic speech component 202 can generate one or more synthesized audio signals that comprise predefined content, such as one or more scripted sentences. In another example, in various embodiments the synthetic speech component 202 can generate one or more synthesized audio signals that comprise content based on the content of the one or more given audio signals, as determined by the speech content component 112. For instance, the synthetic speech component 202 can generate one or more synthetic audio signals that characterize the same sentences, sentence structure, and/or words determined (e.g., by the speech content component 112) to be expressed by the one or more given audio signals. Thus, the synthetic speech component 202 can generate one or more computer-generated synthetic audio signals characterizing one or more synthetic speech samples that comprise the same content as the one or more given audio samples (e.g., and thereby audio signals).

At least because the one or more synthetic speech samples are computer generated, the synthetic speech samples comprise known deterministic features and/or speaker-specific features. For examples, the deterministic features can regard the same, or substantially the same, content as the one or more given audio signals, and/or the speaker-specific features can regard known conditions of the speech synthetization process. For instance, the one or more synthetic speech samples can be generated to emulate one or more conditions of a speaker, such as a particular age, accent, and/or health condition. Since the content corresponding the deterministic features of the synthetic signals can be known (e.g., predetermined and/or determined via the speech content component 112) and/or the conditions of the speaker corresponding to the speaker-specific features can also be known (e.g., as one or more settings of the speech synthesis process), the speech analysis component 108 can utilized the one or more synthetic audio signals as reference signals to facilitate identification of speaker-specific features comprised within the one or more given audio signals characterizing the one or more given audio samples.

Further, in one or more embodiments the synthetic speech component 202 can generate a plurality of synthetic speech samples and associate synthetic audio signals based on the content of the one or more given audio signals. Each synthetic speech signal can regard a respective discrepancy in how the content of the synthetic speech sample can be expressed. For example, wherein a word can be pronounced in two acceptable manners; a first synthetic audio signal can characterize the word in accordance with the first acceptable manner, while a second synthetic audio signal can characterize the word in accordance with the second acceptable manner. Further, the respective synthetic audio signals of the plurality of synthetic audio signals can be generated in accordance with difference speech algorithms. For instance, the synthetic speech component 202 can use a first speech generating application to generate a first synthetic speech signal and a second speech generating application to generate a second synthetic speech signal.

In various embodiments, the synthetic speech component 202 can further assign mathematical weights to the respective synthetic audio signals of the plurality of synthetic audio signals to prioritize one or more synthetic audio signals over other synthetic audio signals (e.g., to establish one or more preferences). In some embodiments, the mathematical weights can be assigned based on user data (e.g., geographical origin) of the speaker providing the one or more given audio samples. For instance, the user data can facilitate the synthetic speech component 202 in prioritizing synthetic audio signals that are more likely to express the given content in a similar manner as the one or more given audio signals.

Figure 3:
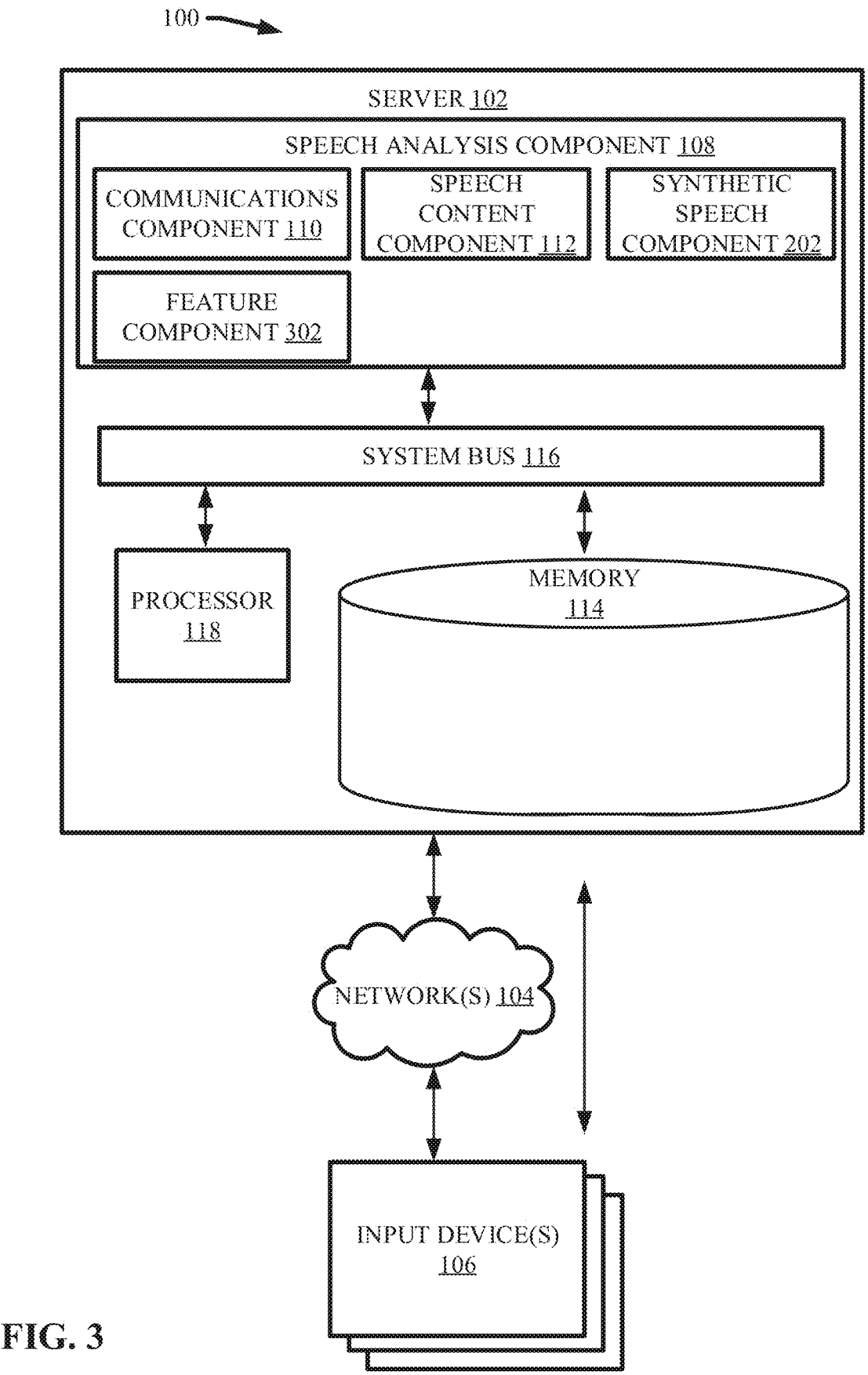
FIG. 3 illustrates a block diagram of an example, non-limiting system that extract one or more features vector from one or more audio signals and/or synthetic reference audio signals in accordance with one or more embodiments described herein.

FIG. 3 illustrates the example, non-limiting system 100 further comprising feature component 302 in accordance with one or more embodiments described herein. Repetitive description of like elements employed in other embodiments described herein is omitted for sake of brevity. In various embodiments, the feature component 302 can extract one more features vectors from the one or more given audio signals and/or synthetic audio signals.

In various embodiments, the one or more features vectors can regard deterministic features and/or speaker-specific features from the one or more given audio signals and/or synthetic audio signals. For example, the feature component 302 can extract the one or more deterministic features and/or speaker-specific features from the one or more given audio signals and/or synthetic audio signals as one or more feature vectors. Further, the feature component 302 can apply one or more transformation algorithms to the one or more feature vectors from the one or more given audio signals to render the vectors compatible with one or more feature vectors from the one or more synthetic audio signals to facilitate one or more comparisons. For example, the one or more given audio signals and the one or more synthetic audio signals can be misaligned timewise (e.g., words of the given audio sample can be spoken at a different speed than words spoken by the synthetic audio sample); whereby the one or more transformation algorithms can time align subject feature vectors to facilitate one or more comparisons between the one of more given audio signals and synthetic audio signals.

In one or more embodiments, a given audio signal can be associated with one or more deterministic feature vectors extracted from the given audio signal, speaker-specific feature vectors extracted from the given audio signal, deterministic feature vectors extracted from the synthesized audio signal, and/or speaker-specific features extracted from the synthesized audio signal. Further, the one or more deterministic feature vectors extracted from the given audio signal and the synthesized audio signal can be the same, or substantially similar, since both sets of feature vectors characterize the same content. Moreover, wherein the synthetic speech component 202 generates a plurality of synthesized audio signals, the feature component 302 can extract feature vectors from each of the synthesized audio signals and average the feature vectors in accordance with one or more assigned mathematical weights.

Figure 4:
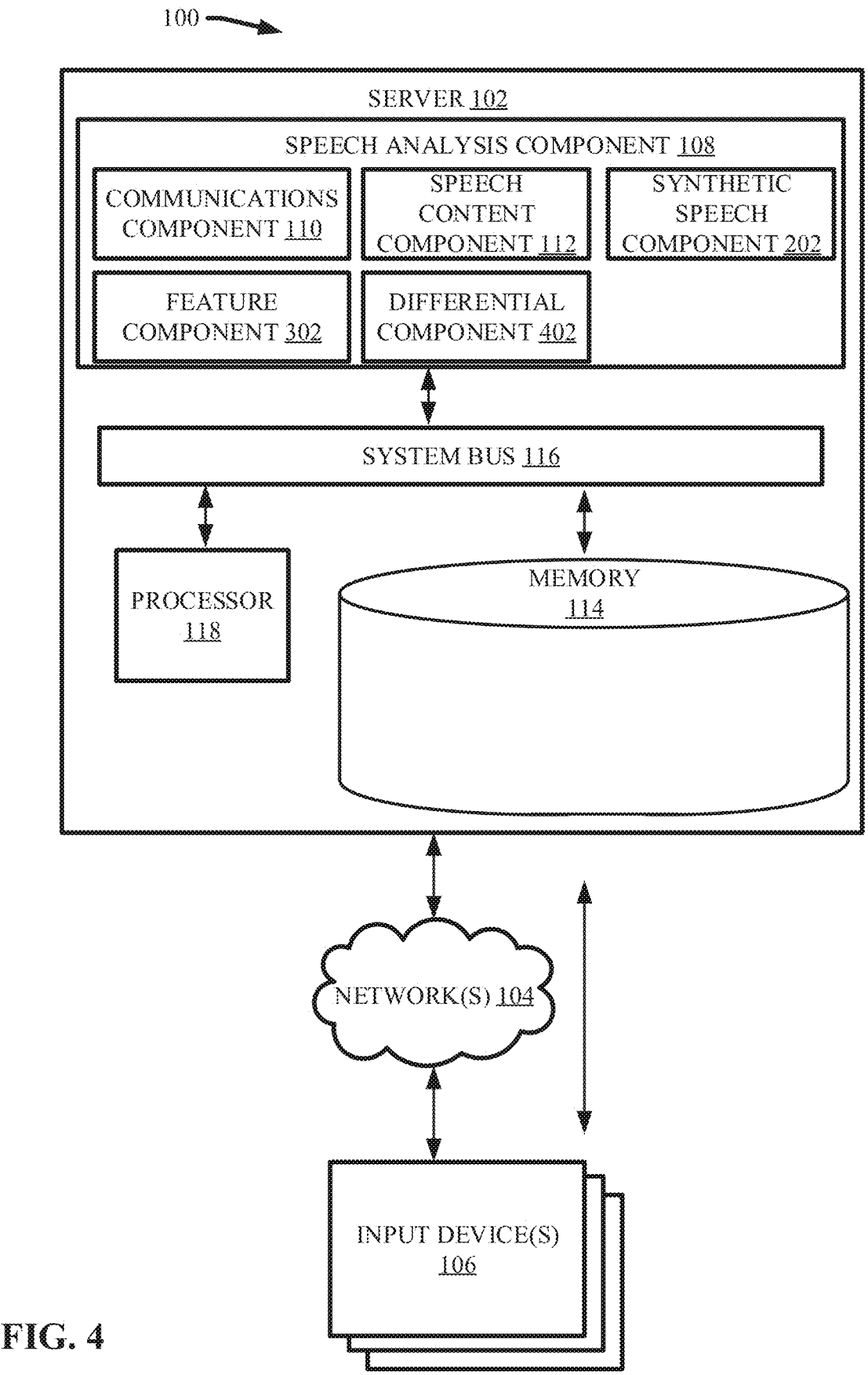
FIG. 4 illustrates a block diagram of an example, non-limiting system that can determine a difference between feature vectors of one or more audio signals and feature vectors of one or more synthetic reference audio signals in accordance with one or more embodiments described herein.

FIG. 4 illustrates the example, non-limiting system 100 further comprising differential component 402 in accordance with one or more embodiments described herein. Repetitive description of like elements employed in other embodiments described herein is omitted for sake of brevity. In various embodiments, the differential component 402 can determine a difference between the speak-specific feature vectors of the one or more given audio signals and synthesized audio signals to determine one or more speech patterns of the given speaker.

For example, the differential component 402 can subtract the feature vectors of the one or more given audio signals from the feature vectors of the one or more synthesized audio signals to identify one or more differences between the speaker-specific features. At least because the deterministic feature vectors of the one or more given audio signals and/or synthesized signals can be the same, or substantially the same (e.g., since both sets of deterministic feature vectors can regard the same content), subtracting the feature vectors of the one or more given audio signals from the feature vectors of the one or more synthesized audio signals can remove the deterministic features from the speech characterization. Thus, features correlating to the content of the given audio samples can be excluded from the speech characterization performed by the speech analysis component 108; thereby enabling the speech characterization to be based on speaker-specific features. In other words, the differential component 402 can utilize the one or more synthesized audio signals as a reference to remove deterministic features from the speech characterization and/or identify speech patterns correlating to the speaker-specific features of the given audio sample.

In various embodiments, the difference resulting from subtracting the feature vectors of the one or more given audio signals from the feature vectors of the one or more synthesized audio signals can characterize one or more speech patterns of the given speaker. For example, the differential component 402 can determine the amount of deviation between the speaker-specific feature vectors of the one or more given audio signals from the one or more speaker-specific feature vectors of the one or more synthesized audio signals. Further, the one or more speaker-specific feature vectors of the one or more synthetic audio signals can be predefined; thereby the one or more speaker-specific feature vectors of the one or more synthetic audio signals can serve as a reference, wherein the amount of deviation from the reference can correlate to one or more speech patterns of the given speaker.

Figure 5:
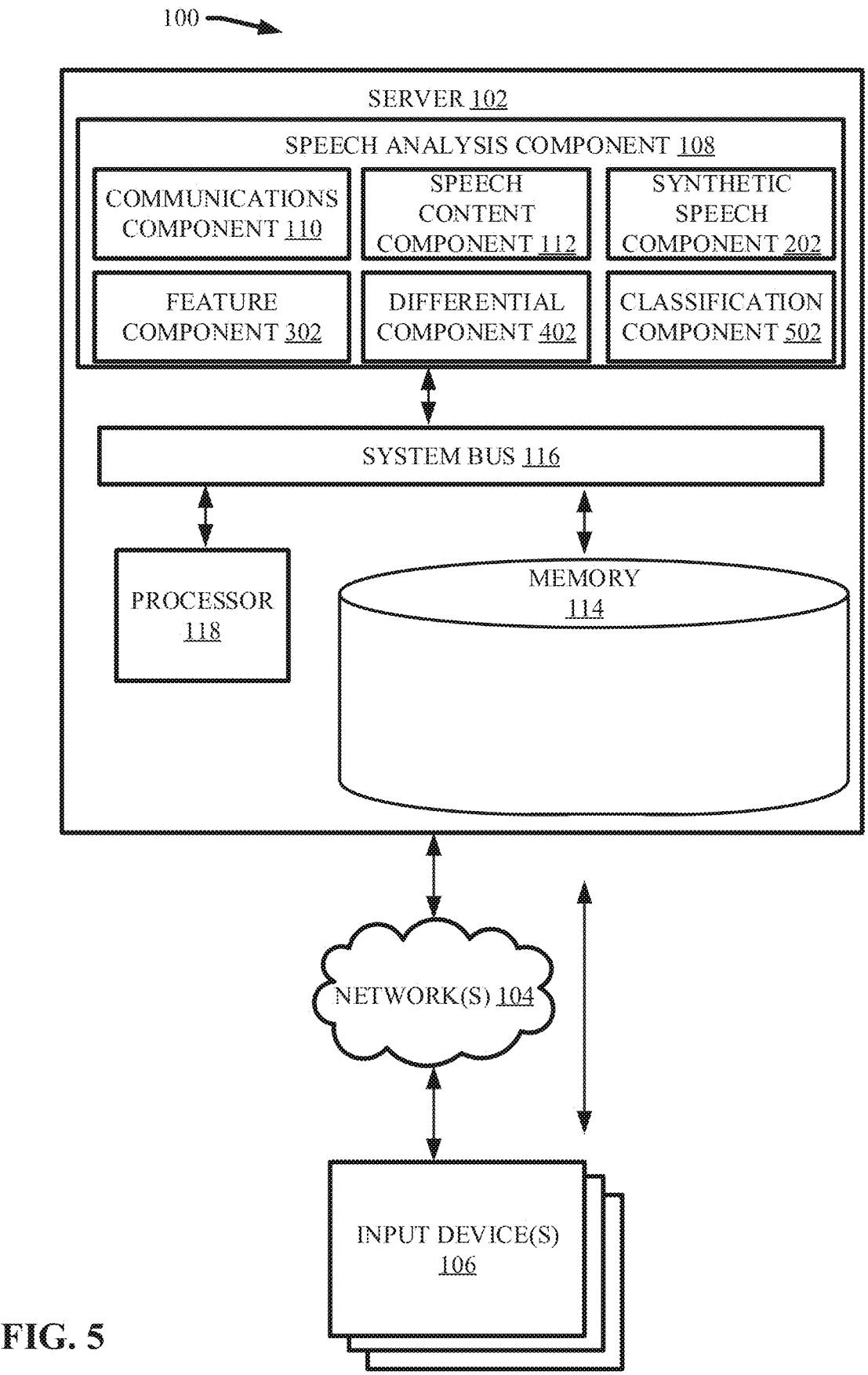
FIG. 5 illustrates a block diagram of an example, non-limiting system that can classify one or more speech patterns with one or more conditions associated with the origin of the one or more speech patterns in accordance with one or more embodiments described herein.

FIG. 5 illustrates the example, non-limiting system 100 further comprising classification component 502 in accordance with one or more embodiments described herein. Repetitive description of like elements employed in other embodiments described herein is omitted for sake of brevity. In various embodiments, the classification component 502 can the one or more speech patterns with one or more conditions associated with the given speaker.

In one or more embodiments, one or more conditions of the given speaker can be associated as an origin for the one or more determined speech patterns. Example conditions can include but are not limited to: age, geographical origins, emotional status, health status, a combination thereof, and/or the like. Thereby, the classification component 502 can determine one or more conditions of the given speaker based on the one or more speech patterns determined by the differential component 402.

In various embodiments, the classification component 502 can utilize one or more machine learning models to classify the one or more speech patterns with one or more conditions. For example, the classification component 502 can generate one or more neural network models to perform the classifications. As used herein, the term "neural network model" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze data with unknown outcomes, based on lessons learning from training data, to facilitate one or more machine learning tasks. Example neural network models can include, but are not limited to: perceptron ("P"), feed forward ("FF"), radial basis network ("RBF"), deep feed forward ("DFF"), recurrent neural network ("RNN"), long/ short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machining ("LSM"), extreme learning machine ("ELM"), echo state network ("ESN"), deep residual network ("DRN"), kohonen network ("KN"), support vector machine ("SVM"), and/or neural turing machine ("NTM").

Figure 6:
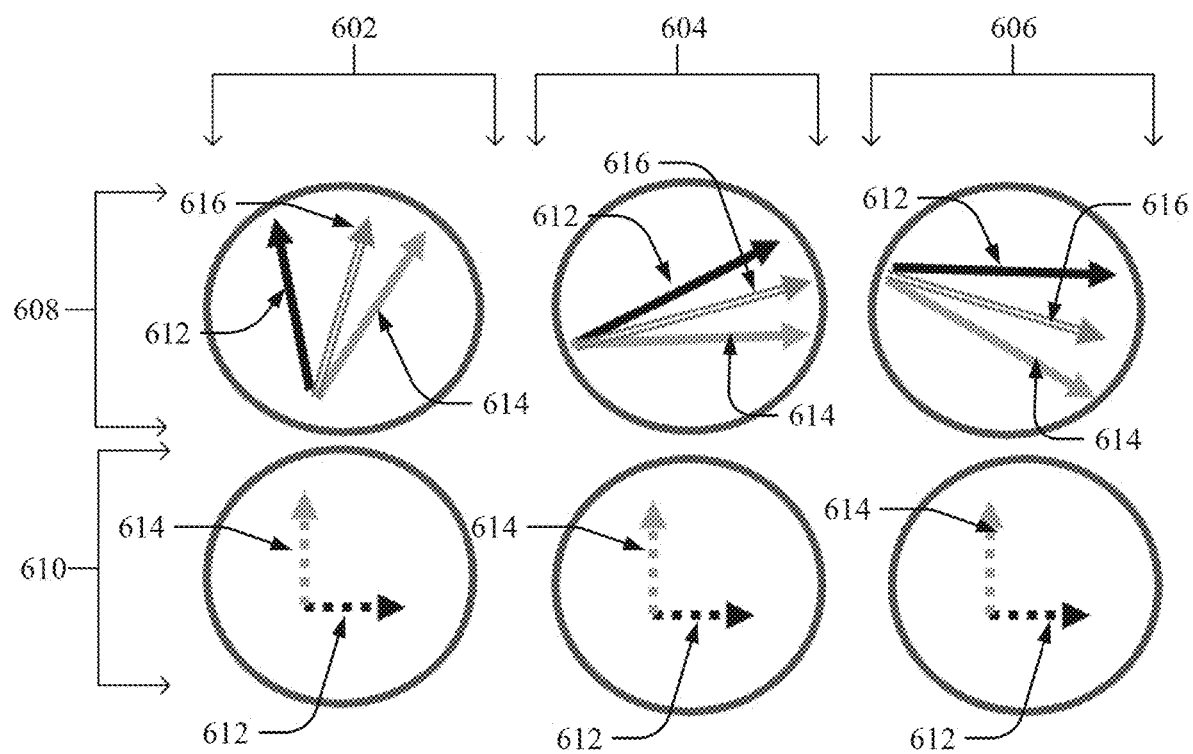
FIG. 6 illustrates a diagram of example, non-limiting feature vectors that can be extracted from one or more audio signals and/or synthetic reference audio signals in accordance with one or more embodiments described herein.

FIG. 6 illustrates a diagram of example, non-limiting feature vector analyses that can be generated by the speech analysis component 108 (e.g., via the feature component 302 and/or differential component 402) in accordance with one or more embodiments described herein. Repetitive description of like elements employed in other embodiments described herein is omitted for sake of brevity. The first column 602 of feature vectors can regard a first sentence comprised within a given audio sample. The second column 604 of feature vectors can regard a second sentence comprised within a given audio sample. The third column 606 of feature vectors can regard a third sentence comprised within a given audio sample.

The first row 608 of feature vectors can regard feature vectors extracted by the feature component 302. The second row 610 of feature vectors can regard feature vectors characterizing the speech pattern of the given speaker in association with the subject sentence. As shown in FIG. 6, the feature component 302 can extract a first speaker-specific feature vector 612 from the audio signal associated with each of the sentences. Also, the feature component 302 can extract a second speaker-specific feature vector 614 from the synthesized audio signal associated with each of the sentences. Further, the feature component 302 can extract mutual deterministic feature vectors 616 from the given audio signal and synthesized audio signal, wherein the deterministic feature vectors of the given audio signal and the synthesized audio signal can share a mutual, or near-mutual, space in the vector space (e.g., as depicted by the dual arrow show in FIG. 6) at least because the deterministic vectors can be based on the same content.

In one or more embodiments, the feature component 302 can extract the feature vectors and/or apply the one or more transformation algorithms to the one or more feature vectors to render the feature vectors within the same vector space. Thereby, the feature component 302 can generate the one or more feature vector analyses depicted in the first row 608. Further, the differential component 402 can subtract the feature vectors of the given audio signal from the feature vectors of the synthesized audio signal to determine a speech pattern of the speaker. As shown in the second row 610, the subtraction performed by the differential component 402 can remove the deterministic feature vectors from the vector space, wherein the remaining speaker-specific feature vectors can characterize the speech pattern.

Figure 7:
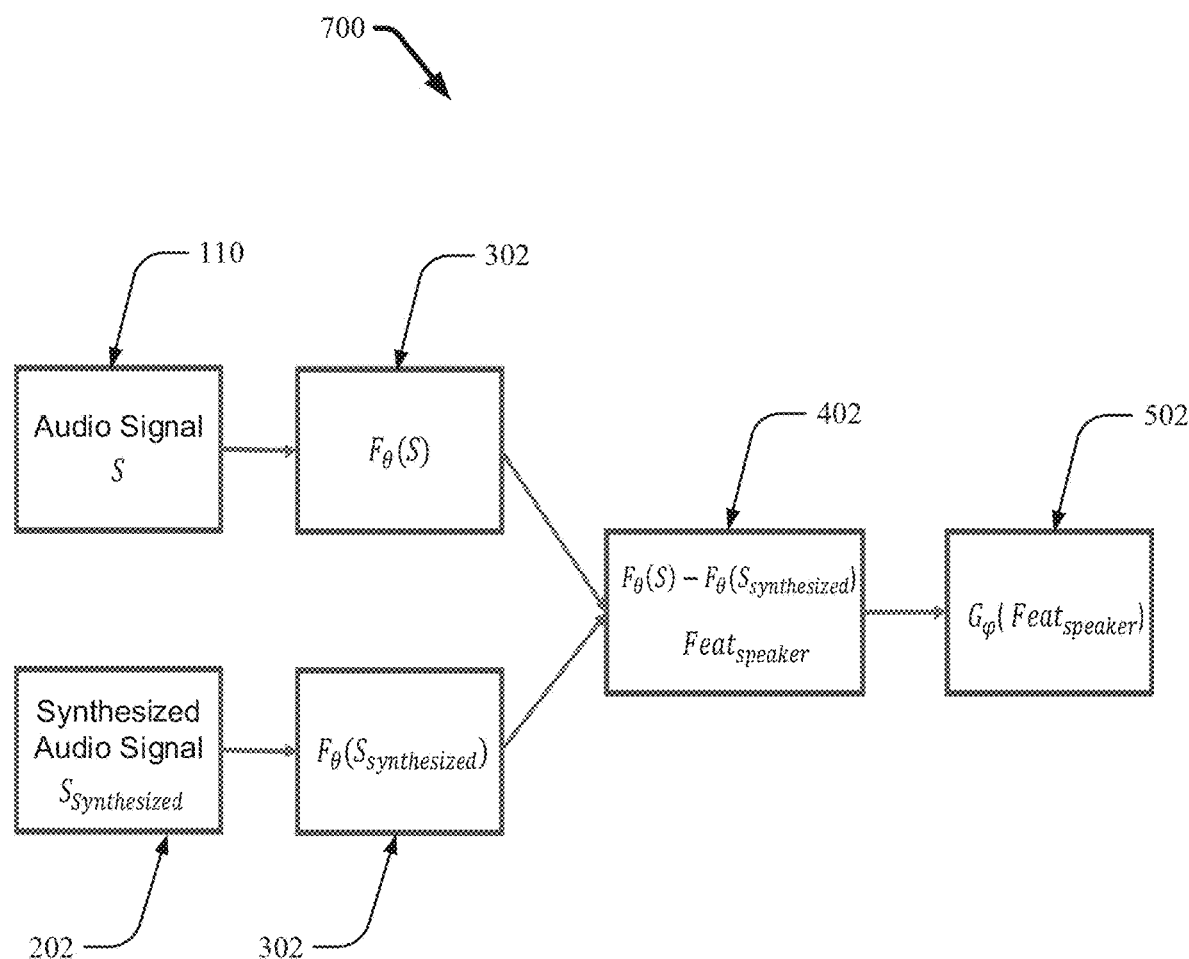
FIG. 7 illustrates a diagram of an example, non-limiting speech characterization process that can be executed by one or more computer program components to characterize one or more speech patterns in accordance with one or more embodiments described herein.

FIG. 7 illustrates an example, non-limiting speech characterization process 700 that can be implemented by the system 100 to determine one or more conditions of a given speaker in accordance with one or more embodiments described herein. Repetitive description of like elements employed in other embodiments described herein is omitted for sake of brevity. FIG. 7 illustrates an embodiment of the characterization process 700 in which the speaker generates the audio sample in accordance with predefined content (e.g., in accordance with a script). However, embodiments of the characterization process 700 in which the speaker generates the content of the audio sample spontaneously and/or the content is determine by the speech content component 112 are also envisaged.

As shown in FIG. 7, the communications component 110 can receive one or more given audio signals characterizing the audio sample provided by the given speaker. Further, the communications component 110 can share the one or more given audio signals with the feature component 302. Further, the synthetic speech component 202 can generate one or more synthesized audio signals, wherein the one or more synthesized audio signals can comprise the same, or substantially the same, content as the given audio signals. Also, the synthetic speech component 202 can share the one or more synthesized audio signals with the feature component 302.

The feature component 302 can then analyze the one or more given audio signals and/or synthesized audio signals to extract one or more feature vectors. Further, the feature component 302 can apply one or more transformation algorithms (e.g., represented in FIG. 7 by "$F_\theta$") to the one or more feature vectors to render the feature vectors compatible within the same vector space (e.g., to align one or more parameters of the feature vectors, such as the timing in which the content characterized by the feature vectors is expressed by the given audio signal and/or synthetic audio signal).

The feature component 302 can share the functions of the transformation algorithms (e.g., represented by "$F_\theta(S)$" and "$F_\theta(S_{synthesized})$" in FIG. 7) with differential component 402. The differential component 402 can subtract the function of the transformation algorithm of the one or more synthetic audio signals (e.g., represented by "$F_\theta(S_{synthesized})$" in FIG. 7), which can characterize the feature vectors extracted from the one or more synthetic audio signals, from the function of the transformation algorithm of the one or more given audio signals (e.g., represented by "$F_\theta(S)$" in FIG. 7), which can characterize the feature vectors extracted from the one or more given audio signals. The resulting differential can delineate one or more speech patterns of the given speaker (e.g., represented by "$Feat_{speaker}$" in FIG. 7).

Further, the differential component 402 can share the one or more speech patterns with the classification component 502. The classification component 502 can utilize one or more machine learning models to classify (e.g., represented by "$G_\varphi(Feat_{speaker})$" in FIG. 7) the speech pattern with one or more conditions that can be associated with the given speaker. For example, the classification component 502 can use one or more neural network models to classify the one or more speech patterns. As described herein, the one or more speech patterns can be absent of deterministic features (e.g., due to the differential component 402); thereby, the classification can be based particularly on speaker-specific features unique to the given speaker. In various embodiments, the classification can correlate conditions such as age, geographical origin, and/or health status to the given speaker.

Figure 8:
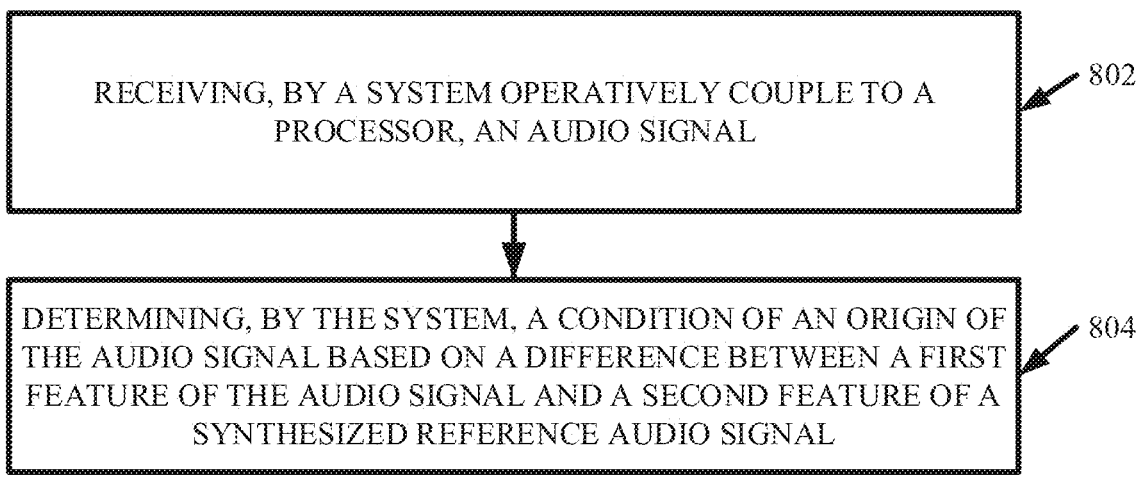
FIG. 8 illustrates a flow diagram of an example, non-limiting method that can facilitate characterizing one or more speech patterns based on one or more synthetic reference audio signals in accordance with one or more embodiments described herein.

FIG. 8 illustrates a flow diagram of an example, non-limiting method 800 that can facilitate autonomous speech characterization to determine one or more conditions associated with a speaker in accordance with one or more embodiments described herein. Repetitive description of like elements employed in other embodiments described herein is omitted for sake of brevity.

At 802, the method 800 can comprise receiving (e.g., via communications component 110), by a system 100 operatively coupled to a processor 118, one or more audio signals.

In various embodiments, the one or more audio signals can characterize one or more audio samples captured by one or more input devices 106 (e.g., via one or more microphones). Further, the one or more audio signals can comprise one or more deterministic features and/or speaker-specific features. The one or more deterministic features can regard the content of the one or more audio samples, and the one or more speaker-specific features can regard one or more parameters of the audio sample uniquely attributed to the given speaker.

At 804, the method 800 can comprise determining (e.g., via the speech analysis component 108), by the system 100, one or more conditions of an origin of the audio signal based on a difference between a first feature of the audio signal and a second feature of synthesized reference audio signal. For example, method 800 at 804 can comprise determining one or more conditions of the speaker that originated (e.g., spoke) the audio sample characterized by the one or more audio signals. Example conditions that can be determined at 804 can include, but are not limited to: age, identity, emotional state, accent, geographical origin, health status, a combination thereof, and/or the like.

In various embodiments, the synthesized reference audio signal can be computer generated and/or can comprise the same, or substantially the same, content as the audio signal. For example, the audio signal and the synthesized reference audio signal can characterize the same, or substantially the same, sentence structure (e.g., word composition and/or arrangement). In one or more embodiments, the system 100 can utilize the synthesized reference audio signal to remove one or more deterministic features from the audio signal so as to determine the condition of the speaker based on the speaker-specific features.

Figure 9:
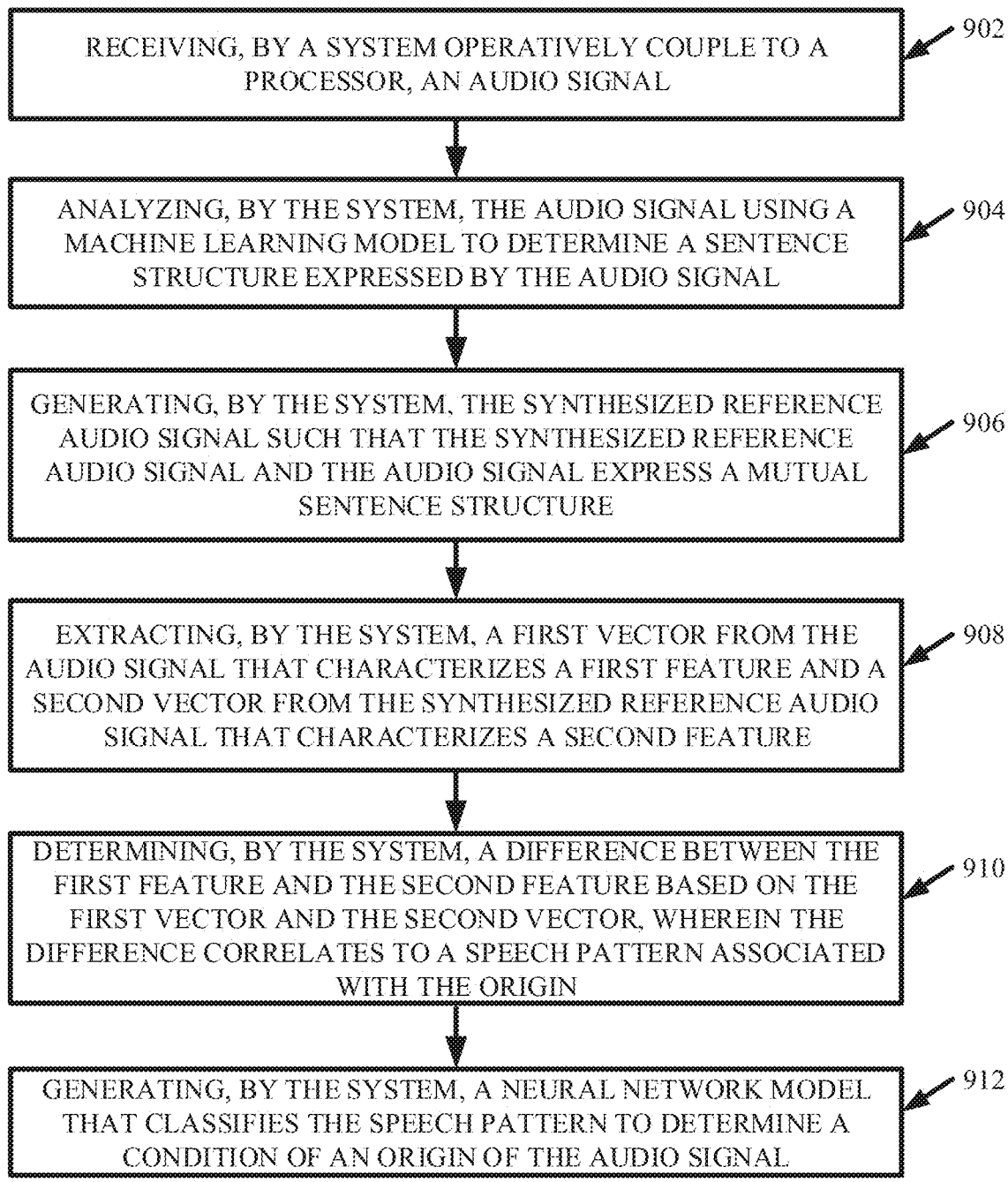
FIG. 9 illustrates a flow diagram of an example, non-limiting method that can facilitate characterizing one or more speech patterns based on one or more synthetic reference audio signals in accordance with one or more embodiments described herein.

FIG. 9 illustrates a flow diagram of an example, non-limiting method 900 that can facilitate autonomous speech characterization to determine one or more conditions associated with a speaker in accordance with one or more embodiments described herein. Repetitive description of like elements employed in other embodiments described herein is omitted for sake of brevity.

At 902, the method 900 can comprise receiving (e.g., via communications component 110), by a system 100 operatively coupled to a processor 118, one or more audio signals. In various embodiments, the one or more audio signals can characterize one or more audio samples captured by one or more input devices 106 (e.g., via one or more microphones). Further, the one or more audio signals can comprise one or more deterministic features and/or speaker-specific features. The one or more deterministic features can regard the content of the one or more audio samples, and the one or more speaker-specific features can regard one or more parameters of the audio sample uniquely attributed to the given speaker.

At 904, the method 900 can comprise analyzing (e.g., via speech content component 112), by the system 100, the one or more audio signals using one or more machine learning models to determine a sentence structure expressed by the one or more audio signals. For example, the sentence structure (e.g., word composition and/or arrangement) can be the content of the audio sample characterized by the one or more audio signals. In various embodiments, the one or more deterministic features of the audio signals can regard the sentence structure.

At 906, the method 900 can comprise generating (e.g., via synthetic speech component 202), by the system 100, one or more synthesized reference audio signals such that the one or more synthesized reference audio signals and audio signals express a mutual sentence structure. For example, generating the one or more synthesized reference audio signals can be based on the sentence structure determined at 904. In various embodiments, the one or more synthesized reference audio signals can be generated to have the same, or substantially the same, sentence structure as the one or more audio signals such that the one or more deterministic features of the synthesized reference audio signal can be the same, or substantially the same, as the deterministic features of the one or more audio signals.

At 908, the method 900 can comprising extracting (e.g., via feature component 302), by the system 100, one or more first vectors from the audio signal that can characterize a first feature and one or more second vectors from the synthesized reference audio signal that can characterize a second feature. For example, the method 900 at 908 can comprise extracting feature vectors regarding the deterministic features and/or speaker-specific features from the audio signal and/or synthesized reference audio signal. Further, the method 900 can comprise performing one or more transformation algorithms to align the feature vectors of the audio signal with the feature vectors of the synthesized reference audio signal, as described herein. For instance, the extracted vectors can populate a common vector space as depicted in FIG. 6.

At 910, the method 900 can comprise determining (e.g., via differential component 402), by the system 100, a difference between the one or more first features and the one or more second features based on the one or more first vectors and/or second vectors, wherein the difference can correlate to a speech pattern associated with the origin of the audio signal. For example, the method 900 at 910 can comprise determining a difference between the feature vectors of the audio signal and the feature vectors of the synthesized reference audio signal. At least because the audio signal and the synthesized reference audio signal can regard the same, or substantially the same, content; the audio signal and the synthesized reference audio signal can likewise share the same, or substantially the same, deterministic feature vectors. Thereby, the difference between the feature vectors of the audio signal and the synthesized reference audio signal can be based one or more deviations caused by the speaker-specific feature vectors. Thus, the difference determined at 910 can be indicative of a speech pattern associated with the origin of the audio signal (e.g., the speaker of the audio sample).

At 912, the method 900 can comprise generating (e.g., via classification component 502), by the system 100, one or more neural network models that can classify the speech pattern to determine one or more conditions of an origin of the audio signal. For example, the method 900 at 912 can comprise correlating the speech pattern determined at 910 with one or more conditions associated with the speaker of the given audio sample characterized by the audio signal. Example conditions that can be determined at 912 can include, but are not limited to: age, identity, emotional state, accent, geographical origin, health status, a combination thereof, and/or the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
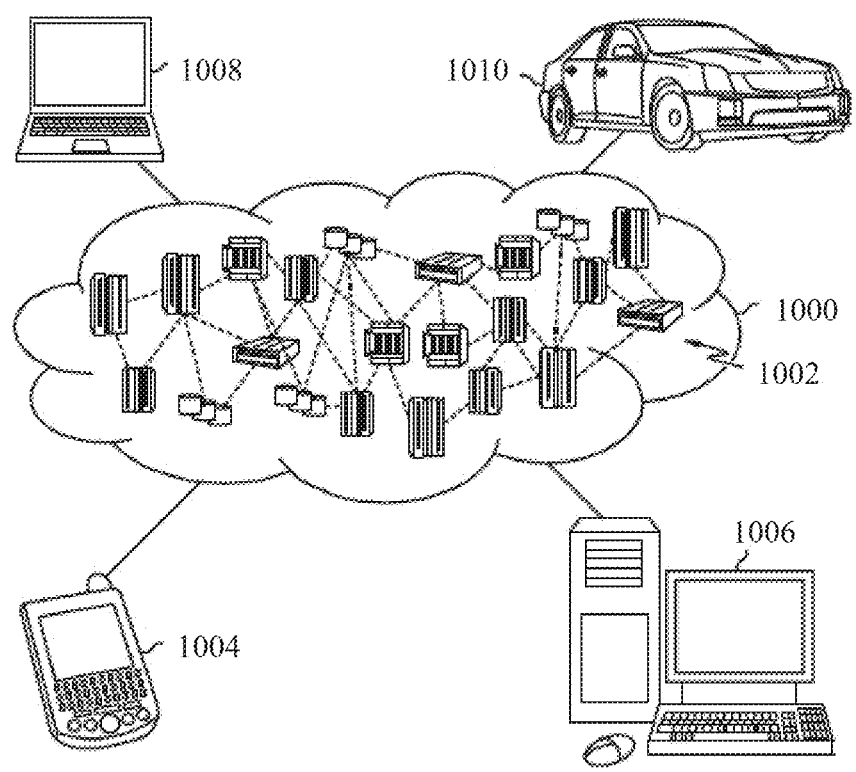
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
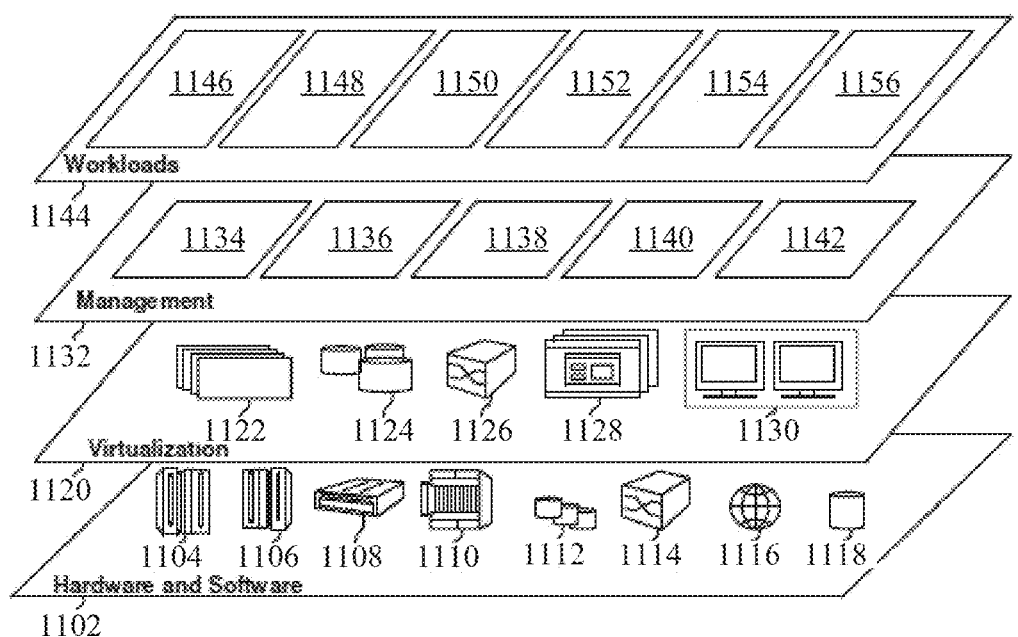
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124;

virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and speech characterization 1156. Various embodiments of the present invention can utilize the cloud computing environment described with reference to FIGS. 10 and 11 to facilitate one or more speech characterization processes (e.g., classifying one or more determined speech patterns with one or more conditions), as described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
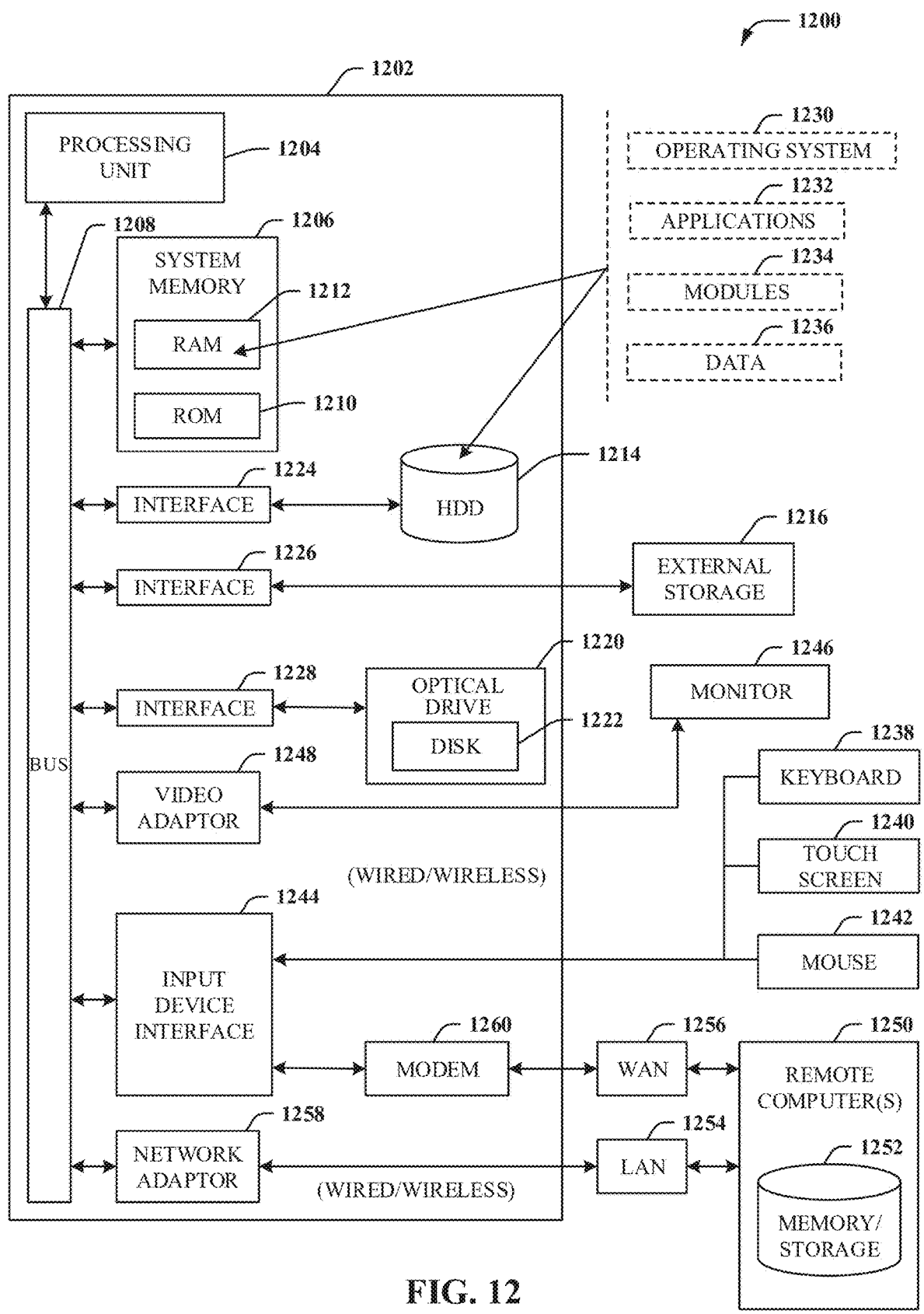
FIG. 12 illustrates a block diagram of an example, non-limiting operating environment in which one or more embodiments described herein can be facilitated.

In order to provide additional context for various embodiments described herein, FIG. 12 and the following discussion are intended to provide a general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system ("BIOS") can be stored in a non-volatile memory such as ROM, erasable programmable read only memory ("EPROM"), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive ("HDD") 1214 (e.g., EIDE, SATA), one or more external storage devices 1216 (e.g., a magnetic floppy disk drive ("FDD") 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive ("SSD") could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine ("VM") of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1202, e.g., applied at the application execution level or at the operating system ("OS") kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/ wireless connectivity to a local area network ("LAN") 1254 and/or larger networks, e.g., a wide area network ("WAN") 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point ("AP") disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/ storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor, operably coupled to the memory, and that executes the computer executable components stored in the memory, wherein the computer executable components comprise:
a synthetic speech component that:
obtains a first audio signal comprising first speech generated by a human, wherein the audio signal comprises deterministic features and speaker-specific features;
generates a plurality of synthesized reference audio signals respectively using different speech algorithms, wherein the audio signal and the plurality of synthesized reference audio signals express a mutual sentence structure, and the respective synthesized reference audio signals of the plurality of synthesized reference audio signals are generated, based on the speaker-specific features to emulate impacts of different health conditions on the first speech;
assign respective weights to synthesized reference audio signals of plurality of synthesized reference audio signals based on user data associated with the human; and
transform, based on the deterministic features, a second audio signal comprising second speech generated by the human into a transformed second audio signal that expresses the mutual sentence structure of the first audio signal and the plurality of synthesized reference audio signals;
a differential component that determines a difference between a first vector that characterizes a first speaker-specific feature of the transformed second audio signal and a second vector that characterizes a second speaker-specific feature of a synthesized reference audio signal selected from the plurality of synthesized reference audio signals based on the respective weights, wherein the difference correlates to a speech pattern of the human; and
a speech analysis component that determines at least one condition of the human based on the difference, wherein the at least one condition comprises a health condition of the human from the different health conditions.

2. The system of claim 1, wherein the synthetic speech component applies one or more transformation algorithms on at least of the first vector or the second vector to correct a timing misalignment between the first vector and the second vector.

3. The system of claim 2, further comprising:
a speech content component that analyzes the first audio signal using machine learning model to determine a sentence structure expressed by the first audio signal, and wherein the synthetic speech component generates the plurality of synthesized reference audio signals to match the sentence structure.

4. The system of claim 1, wherein:
the different component determines respective differences between the first vector and respective second vectors that characterize the second speaker-specific feature of the plurality of synthesized reference audio signals; and
the speech analysis determines the at least one condition of the human based on the respective differences.

5. The system of claim 1, further comprising:
a feature component that extracts the first vector from the transformed second audio signal that characterizes the first feature and extracts the second vector from the synthesized reference audio signal that characterizes the second feature.

6. The system of claim 1, further comprising:
a classification component that generates a machine learning model that classifies the speech pattern to determine the condition.

7. The system of claim 6, wherein the machine learning model utilizes a neural network model.

8. The system of claim 1, wherein the at least one condition further comprises a member selected from a group consisting of an identity, an emotional state, an accent, and an age.

9. A computer-implemented method, comprising:
obtaining, by a system operatively coupled to a processor, a first audio signal comprising first speech generated by a human, wherein the audio signal comprises deterministic features and speaker-specific features;

generating, by the system, a plurality of synthesized reference audio signals respectively using different speech algorithms, wherein the audio signal and the plurality of synthesized reference audio signals express a mutual sentence structure, and the respective synthesized reference audio signals of the plurality of synthesized reference audio signals are generated, based on the speaker-specific features to emulate impacts of different health conditions on the first speech;

assigning, by the system, respective weights to the synthesized reference audio signals based on user data associated with the human;

transforming, by the system, based on the deterministic features, a second audio signal comprising second speech generated by the human into a transformed second audio signal that expresses the mutual sentence structure of the first audio signal and the plurality of synthesized reference audio signals;

determining, by the system, a difference between a first speaker-specific feature of the transformed second audio signal and a second vector that characterizes a second speaker-specific feature of a synthesized reference audio signal selected from the plurality of synthesized reference audio signals based on the respective weights, wherein the difference correlates to a speech pattern of the human; and determining, by the system, at least one condition of the human based on the difference, wherein the at least one condition comprises a health condition of the human from the different health conditions.

10. The computer-implemented method of claim 9, further comprising: applying, by the system, one or more transformation algorithms on at least of the first vector or the second vector to correct a timing misalignment between the first vector and the second vector.

11. The computer-implemented method of claim 10, further comprising:

analyzing, by the system, the first audio signal using a machine learning model to determine a sentence structure expressed by the first audio signal.

12. The computer-implemented method of claim 9, further comprising:

extracting, by the system, the first vector from the transformed second audio signal that characterizes the first feature and the second vector from the synthesized reference audio signal that characterizes the second feature.

13. The computer-implemented method of claim 9, wherein:

wherein the determining the difference comprises determining respective differences between the first vector and respective second vectors that characterize the second speaker-specific feature of the plurality of synthesized reference audio signals; and the determining the at least one condition comprises determining the at least one condition of the human based on the respective differences.

14. A computer program product for characterizing speech, the computer program product comprising a computer readable storage medium having program instructions embodied therewith, the program instructions executable by a processor to cause the processor to:

obtain a first audio signal comprising first speech generated by a human, wherein the audio signal comprises deterministic features and speaker-specific features;

generate a plurality of synthesized reference audio signals respectively using different speech algorithms, wherein the audio signal and the plurality of synthesized reference audio signals express a mutual sentence structure, and the respective synthesized reference audio signals of the plurality of synthesized reference audio signals are generated, based on the speaker-specific features to emulate impacts of different health conditions on the first speech;

assign respective weights to the synthesized reference audio signals based on user data associated with a human associated with an origin of an audio signal;

transform, based on the deterministic features, a second audio signal comprising second speech generated by the human into a transformed second audio signal that expresses the mutual sentence structure of the first audio signal and the plurality of synthesized reference audio signals;

determine, by the processor, a difference between a first vector that characterizes a first speaker-specific feature of the transformed second audio signal and a second vector that characterizes a second speaker-specific feature of a synthesized reference audio signal selected from the plurality of synthesized reference audio signals based on the respective weights, wherein the difference correlates to a speech pattern of the human; and determine, by the processor, at least one condition of the human based on the difference, wherein the at least one condition comprises a health condition of the human from the different health conditions.

15. The computer program product of claim 14, wherein apply, by the processor, one or more transformation algorithms on at least of the first vector or the second vector to correct a timing misalignment between the first vector and the second vector.

16. The computer program product of claim 14, wherein the program instructions further cause the processor to:

extract, by the processor, the first vector from the transformed second audio signal that characterizes the first feature and the second vector from the synthesized reference audio signal that characterizes the second feature.

17. The computer program product of claim 14, wherein the program instructions further cause the processor to:

generate, by the processor, a machine learning model that classifies the speech pattern to determine the condition.

18. The computer program product of claim 14, wherein the program instructions further cause the processor:

determine respective differences between the first vector and respective second vectors that characterize the second speaker-specific feature of the plurality of synthesized reference audio signals; and determine the at least one condition of the human based on the respective differences.

19. The computer program product of claim 14, wherein the at least one condition further comprises a member selected from a group consisting of an identity, an emotional state, an accent, and an age.

20. The computer-implemented method of claim 9, wherein the at least one condition further comprises a member selected from a group consisting of an identity, an emotional state, an accent, and an age.

* * * * *